No. 745,609. PATENTED DEC. 1, 1903.
W. K. HENRY.
FOOD CHOPPER.
APPLICATION FILED FEB. 6, 1903.
NO MODEL.
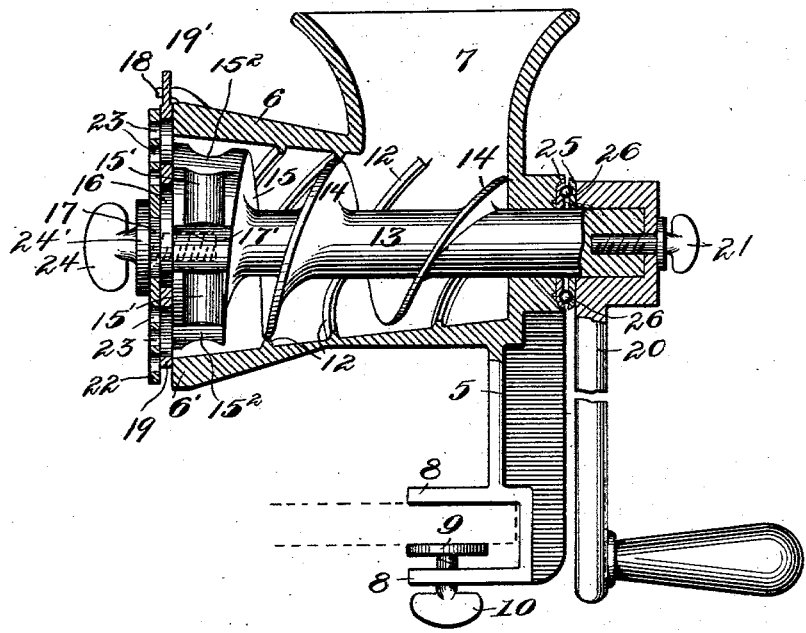
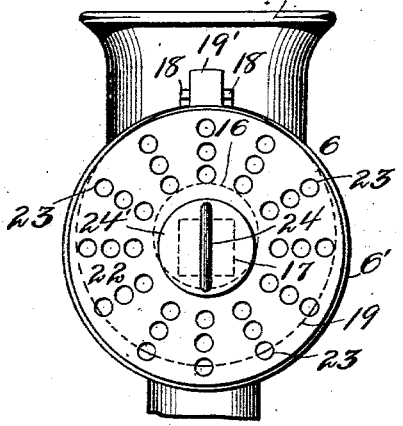 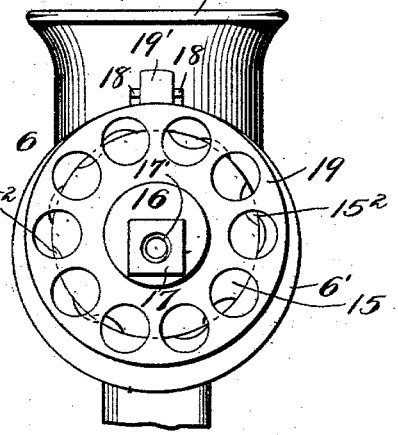
Witnesses:
Y. S. Campbell.
Frances E. Blodgett.
Inventor:
William K. Henry.
By his Attorneys:

No. 745,609. Patented December 1, 1903.

UNITED STATES PATENT OFFICE.

WILLIAM K. HENRY, OF NEW BRITAIN, CONNECTICUT.

FOOD-CHOPPER.

SPECIFICATION forming part of Letters Patent No. 745,609, dated December 1, 1903.

Application filed February 6, 1903. Serial No. 142,113. (No model.)

*To all whom it may concern:*

Be it known that I, WILLIAM K. HENRY, a citizen of the United States of America, residing at New Britain, in the county of Hartford and State of Connecticut, have invented certain new and useful Improvements in Food-Choppers, of which the following is a specification.

My invention relates to food-choppers generally, and has for its object the provision of improvements in the construction of such machines whereby all sorts of food may be readily and easily cut into small particles. Heretofore in the construction of these machines there has been more or less clogging and jamming of the material as it has been advanced by the screw or other forcer employed, and this jamming has occurred in the perforations of the plate through which the material is forced as it leaves the machine and between said plate and the end of the forcer.

Primarily my invention is designed to overcome the difficulties heretofore existing in the operation of this class of machines and to provide in connection with a perforated rotary plate a device for imparting a "shear cut" to the material as it passes through the perforations of said plate.

A further object of the invention is the provision of a rotary forcer provided with an eccentric or equivalent device and of a plate having an opening fitted upon said eccentric and caused to be reciprocated thereby when the forcer is actuated.

A further object of the invention is the provision of a perforated plate through which the meat is forced, of means for reciprocating said plate, and of a rotary plate also provided with perforations, said rotary plate cooperating with the reciprocatory plate.

In the accompanying drawings, Figure 1 is a longitudinal vertical section of a food-chopper containing my improvements. Fig. 2 is an end view of said food-chopper, a part of the supporting-standard being broken away. Fig. 3 is an end view of said food-chopper, showing an eccentric carried by the forcer and the perforated reciprocatory shear-plate actuated by said eccentric, the rotary plate in front of said shear-plate being removed.

Like numerals designate similar parts throughout the several views.

Referring to the drawings, the numeral 5 designates a standard either formed integral with or connected to a casing or barrel 6, having a hopper 7, said standard being provided with lateral projections 8, in the lower of which is mounted a clamping-plate 9, actuated by a thumb-screw 10 in the usual manner. On its inner side the barrel 6 is provided with spiral ribs or corrugations 12, and the open end of said barrel is preferably made flaring, as at 6', to enable the food more readily to escape from the casing to the cutters.

Designated by the numeral 13 is a forcer, which may be of any conventional kind, but is shown as a screw having convolutions 14, the edges of which coöperate with the stationary spiral ribs or corrugations 12 in making a preliminary cut upon the meat or other food within the barrel. At its inner end this forcer is provided with an enlarged head 15, grooved at $15'$ $15^2$ to afford passages for the escape of the food and its more ready delivery to the cutting appliances now to be described. Carried by the end of the forcer is an eccentric 16, and in front of said eccentric is an angular lug or projection 17, internally threaded at $17'$ for a purpose hereinafter stated.

Projecting from and preferably formed integral with the end of the casing or barrel 6 are separated lugs 18, and fitted upon the eccentric 16 is perforated plate 19, having a projection 19', which fits between the lugs of the casing. This plate is provided with perforations of comparatively large size, and, as will be obvious, when the forcer is rotated by the usual handle 20, secured to its end by a thumb-screw 21, the food will be forced through the perforations in the plate, and said plate will be reciprocated by the eccentric 16. Upon the angular end 17 of the forcer is fitted a plate 22, having a series of perforations 23 preferably of smaller size than those of the reciprocatory shear-plate 19, said plate 22 being secured in position upon the angular boss 17 by a thumb-screw 24, having a flange 24', a threaded end of said thumb-screw being inserted in the internal screw or nut 17' of said angular end. Preferably the shaft of the forcer is provided with a cage 25 at its rear end, and in said cage are placed balls or rollers 26, to thereby reduce friction between the hub of the handle 20 and the end of the casing. As will be obvious, when food of any kind is placed in the hopper 7 it will be fed forward by the convolutions 14 of the forcer 13, will receive a preliminary cutting action by the edges of said convolutions and the coöperating spiral corrugations of the barrel, will enter the openings in the reciprocatory shear-plate 19, and will pass from said openings through the smaller perforations in the rotary plate 22. As the forcer is rotated, the eccentric 16 carried thereby causes the plate 19 to reciprocate, said plate being guided and prevented from rotary movement by its extension 19' working between the lugs 18, the result being that the food is severed by a shear cut as it leaves said reciprocatory shear-plate and enters the perforations of the rotary plate 22. In this way tough meats of all kinds may be readily reduced, and, in fact, all sorts of foods may be severed into small particles suitable for culinary use without mashing the fiber of the material and without so squeezing it that the juices will be expressed.

Plates 19 and 22 are reversible, so that either side may be employed for cutting purposes, if desired.

To provide for any required size of cut, interchangeable plates 22, with openings of different diameters, may be employed, and a set of shear-plates 19, the perforations in one plate being of different size from those of another, may also be utilized, if desired. So, too, any desired means may be substituted for the eccentric shown for imparting a reciprocatory motion to the shear-plate.

In cutting food with my improvement the reciprocatory shear-plate coacts with the rotary cutting-plate on the end of the forcer and imparts a grinding or rubbing action to the surface of said rotary plate, and as a consequence the shearing edges of both plates are kept sharp and in proper condition for clean cutting action. Forcers of any suitable kind may be employed as substitutes for the screw forcer shown without departure from the invention, and said invention is not limited to any specific form of casing nor to any particular arrangement of the spiral ribs or convolutions on either the casing or the forcer.

Having thus described my invention, what I claim is—

1. In a food-chopper, the combination, with a casing, of a rotary forcer, a cutting device movable with said forcer; a reciprocatory shearing-plate coöperating with the cutting device; and a cam carried by the forcer-shaft for actuating said shearing-plate.

2. In a food-chopper, the combination, with a casing, of a rotary forcer within said casing; a perforated cutting-plate carried by the forcer; a perforated, reciprocatory shearing-plate movable transversely of said cutting-plate; and means on the forcer for actuating said shearing-plate.

3. In a food-chopper, the combination, with a casing, of a forcer; a perforated, reciprocatory plate actuated by said forcer; means for guiding said plate in its reciprocatory movements; and a perforated, rotary cutting-plate carried by the forcer and coöperating with said reciprocatory plate in severing the food.

4. In a food-chopper, the combination, with a casing, of a forcer within said casing; a perforated, reciprocatory plate actuated by the forcer; and a rotary perforated cutting-plate also actuated by the forcer and coöperating with said reciprocatory plate in severing the food.

5. In a food-chopper, the combination, with a casing, of a screw forcer mounted for rotary movement in said casing; a reciprocatory plate having a series of perforations; means carried by the forcer for actuating said plate; and a rotary perforated plate carried by the forcer and coöperating with the reciprocatory plate.

6. In a food-chopper, the combination, with a casing, of a screw forcer journaled in said casing; a perforated shearing-plate; means on the casing for guiding said plate; means for reciprocating said shearing-plate; a perforated cutting-plate located on one side of the shearing-plate; and means for securing said cutting-plate to the forcer.

7. In a food-chopper, the combination, with a casing, of a screw forcer within said casing; a reciprocatory plate having a series of perforations; a device on the shaft of the forcer for actuating said plate; and means carried by the forcer and coöperating with said plate in severing the material advanced by the forcer.

8. In a food-chopper, the combination, with a casing, of a screw forcer journaled in said casing; a perforated plate having an extension; a guide on the casing for said extension; means carried by the forcer for reciprocating said perforated plate; a second perforated plate; and means for securing said second perforated plate to the forcer.

9. In a food-chopper, the combination, with a casing, of a forcer in said casing; a perforated plate; means for preventing rotary movement of said plate; means for reciprocating said plate; and a rotary device carried by the forcer and coöperating with said plate to sever the food as it issues from the perforations thereof.

10. In a food-chopper, the combination, with a casing, of a screw forcer journaled in said casing; an eccentric carried by the shaft of the forcer; a perforated plate fitted over said eccentric; means for guiding said plate; a second perforated plate; and means for securing said second perforated plate to the forcer.

11. In a food-chopper, the combination, with a casing, of a screw forcer journaled in said casing; an eccentric carried by the forcer; a perforated plate fitted on the eccentric, said plate having an extension; a guide on the casing for said extension; a second perforated plate located in advance of the first perforated plate; and means for securing the second perforated plate to the forcer.

12. In a food-chopper, the combination, with a casing, of a forcer within said casing; a perforated rotary cutting-plate carried by the forcer; a device having a series of cutting edges coöperating with said plate; and means carried by the forcer for reciprocating said device.

In testimony whereof I affix my signature in presence of two witnesses.

WILLIAM K. HENRY.

Witnesses:
FRANK G. CAMPBELL,
MAUDE T. PECK.